Patented May 24, 1938

2,118,506

UNITED STATES PATENT OFFICE 2,118,506

LONG CHAIN ALKOXY ALKANOL ESTERS

George D. Graves, Wilmington, Del., assignor to E. I. du Pont de Nemours & Company, Wilmington, Del., a corporation of Delaware No Drawing. Original application July 7, 1934, Serial No. 734,210. Divided and this application November 22, 1934, Serial No. 754,309

21 Claims. (Cl. 260—103)

This invention relates to new compositions of matter comprising esters of high molecular weight ethers of polyhydric alcohols, and more particularly to carboxylic acid esters of high molecular weight ethers of polyhydric alcohols, and still more particularly to carboxylic acid esters of long chain aliphatic ethers of dihydric alcohols.

This case is a division of copending application Serial No. 734,210, filed July 7, 1934 which has matured into Patent 2,025,048.

This invention has as an object the preparation of esters of high molecular weight ethers of polyhydric alcohols. Other objects will appear hereinafter.

These objects are accomplished by the following invention wherein an ether of a high molecular weight, i. e., long chain aliphatic ether of a polyhydric alcohol, is reacted with an organic acid, and particularly an organic carboxylic acid or the anhydride, chloride, or ester thereof.

In the process of the present invention an ester of a high molecular weight, i. e., long chain alkyl ether of a polyhydric alcohol such as the monododecyl ether of ethylene glycol, is prepared by reacting the long chain alkyl ether of the polyhydric alcohol with an organic acid, and particularly an organic carboxylic acid or its anhydride, its chloride, or its ester with a volatile alcohol. A further method of preparation consists in the reaction of the halide ester of the long chain alkyl ether of the polyhydric alcohol, for example, dodecyloxy-ethyl chloride, with the sodium or other metal salt of the organic acid.

Having outlined above the general purposes and principles of the invention, the following applications thereof to certain specific instances are included for purposes of illustration and not in limitation.

*Example 1.—Laurate of monododecyl ether of ethylene glycol*

Two hundred thirty parts by weight of the monododecyl ether of ethylene glycol and 190 parts by weight of lauric acid were heated for 5 hours at 225°–230° C. The waxy product had an acid number of 3.6, and an ester number of 128.7.

*Example 2.—Acetate of monododecyl ether of ethylene glycol*

Seventy-three parts by weight of dodecyloxyethanol and 25 parts by weight of acetyl chloride were slowly mixed together and after standing for one hour were heated on the steam bath to drive off excess acetyl chloride. The product was washed with aqueous potassium carbonate solution, dried and filtered. It had a saponification number of 215.

*Example 3.—Stearate of monododecyl ether of diethylene glycol*

A mixture of 65 parts by weight of the monododecyl ether of diethylene glycol and 62 parts by weight of stearic acid was heated four hours at 240° C. The wax-like product melted at 24° C. The acid number of the product was 9.4, and the saponification number was 111.

*Example 4.—Adipate of monododecyl ether of ethylene glycol and monododecyl ether of diethylene glycol*

Twenty-two parts by weight of a mixture of monododecyl ether of ethylene glycol and monododecyl ether of diethylene glycol was heated with 4.4 parts by weight of adipic acid 18 hours at 200°–210° C. The acid number of the product was 7.3, and the saponification number was 143.7.

*Example 5.—Phthalate of mixed monoalkyl ethers of ethylene glycol*

A mixture of the alcohols obtained by hydrogenation of coconut oil was reacted in an autoclave with ethylene oxide to obtain the mixed monoalkyl ethers of glycol. Four hundred and fifty parts by weight of these mixed ethers, 150 parts by weight of phthalic anhydride, 300 parts by weight of ethylene dichloride, and 2 parts by weight of sulfuric acid were heated to boiling in an apparatus designed to separate water from the distillate and to return the ethylene dichloride to the reaction vessel. Distillation was continued until the theoretical amount of water had been removed. The product was washed with sodium carbonate solution to remove excess acid and was refined by heating to 130° C. at 50 mm. pressure to remove volatile material. The resulting product was treated with decolorizing carbon and filtered. A light colored oil resulted.

*Example 6.—Oleate of monododecyl ether of ethylene glycol and monododecyl ether of diethylene glycol*

Forty parts by weight of oleic acid and 53 parts by weight of a mixture of the monododecyl ether of ethylene glycol and the monododecyl ether of diethylene glycol were heated 18 hours at 215° C. The acid number of the product was 6.9, and the saponification number was 105.6. The oleate of the monododecyl ether of ethylene glycol was also made by heating under a fractionating column a mixture of one gram mole of the monododecyl ether of ethylene glycol, 1.1 gram moles of methyl oleate, 500 parts by weight of toluene and 5 parts by weight of litharge. Heating was continued until the theoretical amount of the methyl alcohol had been removed as a binary with toluene. The product was filtered and heated to 130° C. at 50 mm. pressure, followed by steaming to remove all traces of volatile material.

*Example 7.—Levulinate of monododecyl ether of ethylene glycol*

Twenty-nine parts by weight of dodecyloxyethanol, 14.6 parts by weight of levulinic acid were heated at 170°–180° C. for 8 hours. The product had a very low acidity. On distillation 24 parts by weight of liquid product boiling 184°–187° C. at 1.5 mm. was isolated which contained the theoretical quantity of carbon and hydrogen. The product was soluble in alcohol, ethyl acetate, benzene, acetone, gasoline, but insoluble in water.

The above examples indicate the use of certain specific long chain alkyl ethers of polyhydric alcohols and certain organic acids.

It is possible to substitute other dihydric alcohols for the ethylene glycol disclosed in some of the above examples. Dihydric alcohols containing from 2 to 22 carbon atoms inclusive, may be employed. These can be prepared by carboxyl hydrogenation of the corresponding hydroxy acids, or by the addition of a molecule of water to the corresponding unsaturated monohydric alcohols. They may also be produced by peracetylation of olefines. Many of these polyhydric alcohols may be reacted with a long chain alcohol to form a monoether which is subsequently reacted with any of the above acids to prepare the esters of the present invention. The alcohols which may be employed to form the monoalkyl ethers of dihydric alcohols embrace alcohols from vegetable oils by hydrogenation, for example, the alcohols present in carboxyl hydrogenated coconut oil, the alcohols obtained from animal oils, such as sperm oil by carboxyl hydrogenation, naphthenyl alcohols by carboxyl hydrogenation of naphthenic acid, eleostearyl alcohol by sodium reduction of China-wood oil, linoleyl alcohol by sodium reduction of linseed oil, ricinoleyl alcohol by sodium reduction of castor oil, abietyl alcohol by sodium reduction of abietic acid, or the higher alcohols obtained in the methanol synthesis.

By "long chain" alcohol is meant an alcohol having at least 8 carbon atoms to the chain, thus including octyl, decyl, dodecyl, tetradecyl, octadecyl, cetyl, as well as other long chain alcohols. "Long chain" alkyl has a similar significance. A particularly useful source of long chain alcohols lies in the mixture of alcohols obtainable from coconut oil by hydrogenation, which consists largely of dodecyl alcohol. This mixture may be employed as well as pure dodecyloxyethanol or the crude form obtainable by reacting dodecyl alcohol with ethylene oxide which contains, in addition to dodecyloxyethanol, unreacted dodecyl alcohol and the monododecyl ether of diethylene glycol.

Organic acids in general may be employed, including the aliphatic acids, for example, those of 1 to 18 carbon atoms inclusive, the acids being either branched or straight chain, substituted or unsubstituted, saturated or unsaturated, and including acetic, propionic, isobutyric, butyric, branched chain acids corresponding to the higher alcohols obtained in the methanol synthesis, capric, caprylic, lauric, levulinic, glycollic, lactic, methoxyacetic, and oleic. Polybasic acids are included within the scope of the invention, including succinic, adipic, and maleic. Aromatic monobasic, and polybasic acids such as benzoic, phthalic, benzoylbenzoic, chlorobenzoylbenzoic; alicyclic acids, such as naphthenic, hexahydrobenzoic, octahydrocinnamic, cyclohexylacetic; and resin acids, such as abietic acid, may be used. Any of the acids mentioned in the examples may be replaced by the above acids or the methyl ester of any of these acids may be substituted for the methyl oleate of Example 6. The acid chloride of any of the acids may be used in place of the acid itself.

The esters of the present invention may be used with or without other plasticizers in the formulation of coating and plastic compositions containing cellulose derivatives such as cellulose nitrate, cellulose acetate, ethyl cellulose, cellulose isobutyrate, cellulose propionate, cellulose butyrate, benzyl cellulose, dodecyl cellulose, butyl cellulose, cellulose crotonate, etc., and/or resins such as "Albertol", polyvinyl chloride-polyvinyl acetate resin, aldehyde modified polyvinyl acetate, methyl methacrylate, polybasic acid-polyhydric alcohol condensation products, ether resins, ketone resins, phenol-aldehyde resins, etc., as well as natural resins such as damar, kauri, sandarac, shellac, and the like, and when thus formulated may be of use in the preparation of lacquers and enamels for coating metal, wood, fabric, paper, and wire screen, dopes for coating fabrics, moistureproof lacquers for coating regenerated cellulose, etc., and in plastic compositions to be used in the manufacture of toilet ware, sheeting, rods, tubes, safety glass interlayers, dentures, etc.

The esters of long chain ethers of ethylene glycol or diethylene glycol are particularly useful as moistureproofing plasticizers for cellulose derivatives. Dodecyloxyethyl laurate and dodecyloxyethyl acetate plasticize cellulose acetate compositions, and dodecyloxyethyl laurate or dodecyloxyethyl stearate may be substituted for castor oil as a softener for artificial leather. Dodecyloxyethyl laurate is a moistureproofing softener for nitrocellulose. Dodecyloxyethyl stearate may be used as a substitute for wax in moistureproofing transparent sheets or regenerated cellulose, and dodecyloxyethyl adipate may be used in smokeless powder compositions. Because of their lack of odor and low volatility they may be used as perfume fixatives.

The esters of the present invention are high-boiling, water-insoluble, hydrocarbon soluble esters of high molecular weight ethers of polyhydric alcohols. These materials have the further advantage of low-volatility and when used in plastic masses show a high degree of water resistance and a high degree of flexibility without excessive softness or tackiness. These ether esters have the advantage over simple esters such as dodecyl acetate or ethyl laurate, which more closely resemble the paraffin hydrocarbons, in that in general they are better solvents for cellulose derivatives.

The above description and examples are intended to be illustrative only. Any modification of or variation therefrom which conforms to the spirit of the invention is intended to be included within the scope of the claims.

I claim:

1. A carboxylic acid ester of a long chain alkyl ether of a dihydric alcohol wherein the long chain alkyl radical contains at least eight carbon atoms and wherein the carboxylic acid radical consists of carbon, hydrogen and oxygen.

2. A monocarboxylic acid ester of a long chain alkyl ether of a dihydric alcohol wherein the long chain alkyl radical contains at least eight carbon atoms and wherein the carboxylic acid radical consists of carbon, hydrogen and oxygen.

3. A monocarboxylic acid ester of a long chain alkyl ether of ethylene glycol wherein the long chain alkyl radical contains at least eight carbon atoms and wherein the carboxylic acid radical consists of carbon, hydrogen and oxygen.

4. An ester composition consisting of carboxylic acid esters of long chain mono-alkyl ethers of a dihydric alcohol wherein the alkyl radicals correspond substantially to those of the alcohols obtainable by carboxylic reduction of a fatty oil and wherein the acyl radical consists of carbon, hydrogen and oxygen.

5. An ester composition consisting of monocarboxylic acid esters of long chain mono-alkyl ethers of a dihydric alcohol wherein the alkyl radicals correspond substantially to those of the alcohols obtainable by carboxylic reduction of a fatty oil and wherein the acyl radical consists of carbon, hydrogen and oxygen.

6. An ester composition consisting of monocarboxylic acid esters of long chain mono-alkyl ethers of ethylene glycol wherein the alkyl radicals correspond substantially to those of the alcohols obtainable by carboxylic reduction of a fatty oil and wherein the acyl radical consists of carbon, hydrogen and oxygen.

7. An ester composition consisting of acetic acid esters of long chain mono-alkyl ethers of a dihydric alcohol wherein the alkyl radicals correspond substantially to those of the alcohols obtainable by carboxylic reduction of a fatty oil.

8. An ester composition consisting of polycarboxylic acid esters of long chain mono-alkyl ethers of a dihydric alcohol wherein the alkyl radicals correspond substantially to those of the alcohols obtainable by carboxylic reduction of a fatty oil and wherein the acyl radical consists of carbon, hydrogen and oxygen.

9. An ester composition consisting of dicarboxylic acid esters of long chain alkyl ethers of a dihydric alcohol wherein the alkyl radicals correspond substantially to those of the alcohols obtainable by carboxylic reduction of a fatty oil and wherein the acyl radical consists of carbon, hydrogen and oxygen.

10. An ester composition consisting of phthalic acid esters of long chain alkyl ethers of a dihydric alcohol wherein the alkyl radicals correspond substantially to those of the alcohols obtainable by carboxylic reduction of a fatty oil.

11. An ester composition consisting of phthalic acid esters of long chain alkyl ethers of ethylene glycol wherein the alkyl radicals correspond substantially to those of the alcohols obtainable by carboxylic reduction of a fatty oil.

12. Esters having the general formula $RCOOCH_2CH_2OR'$ wherein RCOO is the radical of a lower fatty acid consisting of carbon, hydrogen and oxygen and R' is a long chain higher alkyl radical.

13. A lower fatty acid ester of dodecyloxyethanol wherein the fatty acid radical consists of carbon, hydrogen and oxygen.

14. A lower fatty acid ester of cetyloxyethanol wherein the fatty acid radical consists of carbon, hydrogen and oxygen.

15. A propionic acid ester of an alkoxyethanol wherein the alkoxy radical corresponds to a higher fatty alcohol containing at least twelve carbon atoms and wherein the propionic acid radical consists of carbon, hydrogen and oxygen.

16. A propionic acid ester of dodecyloxyethanol wherein the propionic acid radical consists of carbon, hydrogen and oxygen.

17. An acetic acid ester of a long chain alkyl ether of glycol, wherein the long chain alkyl radical contains at least eight carbon atoms wherein the acetic acid radical consists of carbon, hydrogen and oxygen.

18. An acetic acid ester of dodecyloxyethanol wherein the acetic acid radical consists of carbon, hydrogen and oxygen.

19. A polycarboxylic acid ester of a long chain alkyl ether of a dihydric alcohol wherein the long chain alkyl radical contains at least eight carbon atoms and wherein the carboxylic acid radical consists of carbon, hydrogen and oxygen.

20. A polycarboxylic acid ester of a long chain alkyl ether of a dihydric alcohol wherein the long chain alkyl radical contains at least eight carbon atoms and wherein the carboxylic acid radical consists of carbon, hydrogen and oxygen.

21. An ester composition consisting of polycarboxylic acid esters of long chain mono-alkyl ethers of ethylene glycol wherein the alkyl radicals correspond substantially to those of the alcohols obtainable by carboxylic reduction of a fatty oil and wherein the acyl radical consists of carbon, hydrogen and oxygen.

GEORGE D. GRAVES.